(12) United States Patent
Sugiura et al.

(10) Patent No.: US 9,780,400 B2
(45) Date of Patent: Oct. 3, 2017

(54) FUEL CELL HAVING AN EMPTY SPACE GAP BETWEEN THE SEPARATOR AND ELECTRODE

(71) Applicant: HONDA MOTOR CO., LTD., Tokyo (JP)

(72) Inventors: Seiji Sugiura, Wako (JP); Yukihito Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 14/029,802

(22) Filed: Sep. 18, 2013

(65) Prior Publication Data

US 2014/0080030 A1 Mar. 20, 2014

(30) Foreign Application Priority Data

Sep. 18, 2012 (JP) .................................. 2012-204615

(51) Int. Cl.
| | |
|---|---|
| *H01M 8/1004* | (2016.01) |
| *H01M 8/0267* | (2016.01) |
| *H01M 8/0271* | (2016.01) |
| *H01M 8/023* | (2016.01) |
| *H01M 8/0247* | (2016.01) |
| *H01M 8/0258* | (2016.01) |

(Continued)

(52) U.S. Cl.
CPC ......... *H01M 8/1004* (2013.01); *H01M 8/023* (2013.01); *H01M 8/0247* (2013.01); *H01M 8/0258* (2013.01); *H01M 8/0267* (2013.01); *H01M 8/0271* (2013.01); *H01M 8/0273* (2013.01); *H01M 8/0276* (2013.01); *H01M 8/0284* (2013.01); *H01M 2008/1095* (2013.01)

(58) Field of Classification Search
CPC ............ H01M 8/0273–8/0276; H01M 8/1004; H01M 8/023; H01M 8/0247; H01M 8/0258; H01M 8/0284; H01M 2008/1095; H01M 8/0271; H01M 8/0267
See application file for complete search history.

(56) References Cited

U.S. PATENT DOCUMENTS

| 7,320,839 B2 | 1/2008 | Tsuji et al. |
| 7,504,173 B2 | 3/2009 | Kuroki et al. |

(Continued)

FOREIGN PATENT DOCUMENTS

| CN | 1538546 | 10/2004 |
| CN | 1557034 A | 12/2004 |

(Continued)

OTHER PUBLICATIONS

Chinese Office Action for corresponding CN Application No. 201310409891.1, dated Apr. 28, 2015.

(Continued)

*Primary Examiner* — Nicholas P D'Aniello
*Assistant Examiner* — Philip A Stuckey
(74) *Attorney, Agent, or Firm* — Mori & Ward, LLP (57) ABSTRACT

A fuel cell includes a membrane electrode assembly interposed between a cathode-side separator and an anode-side separator. A first gas diffusion layer included in a cathode is designed to have a planar size larger than a planar size of a second gas diffusion layer included in an anode. The anode-side separator has a thin clearance part in a portion that faces an outer peripheral portion of the second gas diffusion layer.

14 Claims, 12 Drawing Sheets

(51) Int. Cl.
  *H01M 8/0273* (2016.01)
  *H01M 8/0276* (2016.01)
  *H01M 8/0284* (2016.01)
  *H01M 8/1018* (2016.01)

(56) References Cited

U.S. PATENT DOCUMENTS

| | | | |
|---|---|---|---|
| 8,703,356 B2 * | 4/2014 | Hayashi | 429/509 |
| 2001/0001052 A1 * | 5/2001 | Bonk et al. | 429/32 |
| 2002/0127461 A1 * | 9/2002 | Sugita et al. | 429/35 |
| 2003/0104262 A1 * | 6/2003 | Kuroki et al. | 429/36 |
| 2007/0122679 A1 * | 5/2007 | Hayashi et al. | 429/35 |

FOREIGN PATENT DOCUMENTS

| | | |
|---|---|---|
| JP | 2002-270202 | 9/2002 |
| JP | 2004-335453 | 11/2004 |
| JP | 2006-210027 | 8/2006 |
| JP | 2006-260810 | 9/2006 |
| JP | 2008-041337 | 2/2008 |
| JP | 2008-171783 | 7/2008 |
| JP | 2010-003470 | 1/2010 |
| JP | 2012-134033 | 7/2012 |
| WO | WO 2005106998 A1 * 11/2005 | H01M 8/02 |

OTHER PUBLICATIONS

Japanese Office Action for corresponding JP Application No. 2012-204615, dated Jul. 1, 2015.

Chinese Office Action for corresponding CN Application No. 201310409891.1, dated Dec. 21, 2015.

Japanese Office Action for corresponding JP Application No. 2012-204615, dated Nov. 4, 2015.

* cited by examiner

BACKGROUND ART

FUEL CELL HAVING AN EMPTY SPACE GAP BETWEEN THE SEPARATOR AND ELECTRODE

CROSS REFERENCES TO RELATED APPLICATIONS

The present application claims priority under 35 U.S.C. §119 to Japanese Patent Application No. 2012-204615, filed Sep. 18, 2012, entitled "Fuel Cell." The contents of this application are incorporated herein by reference in their entirety.

BACKGROUND

1. Field

The present application relates to a fuel cell.

2. Description of the Related Art

A typical solid polymer electrolyte fuel cell includes a solid polymer electrolyte membrane formed of a polymer ion exchange membrane. In such a fuel cell, a membrane-electrode assembly (MEA) constituted by a solid polymer electrolyte membrane interposed between an anode and a cathode each constituted by a catalyst layer (electrode catalyst layer) and a gas diffusion layer (porous carbon) is held between separators (bipolar plates). A desired number of such fuel cells are stacked and used as a fuel cell stack for automobile use, for example.

In some MEA, one of the gas diffusion layers of a MEA is designed to have a smaller planar size than that of the solid polymer electrolyte membrane while the other gas diffusion layer is designed to have a planar size smaller than or the same as that of the solid polymer electrolyte membrane but larger than that of the one gas diffusion layer. This type of MEA is known as a step MEA.

Figure 12:
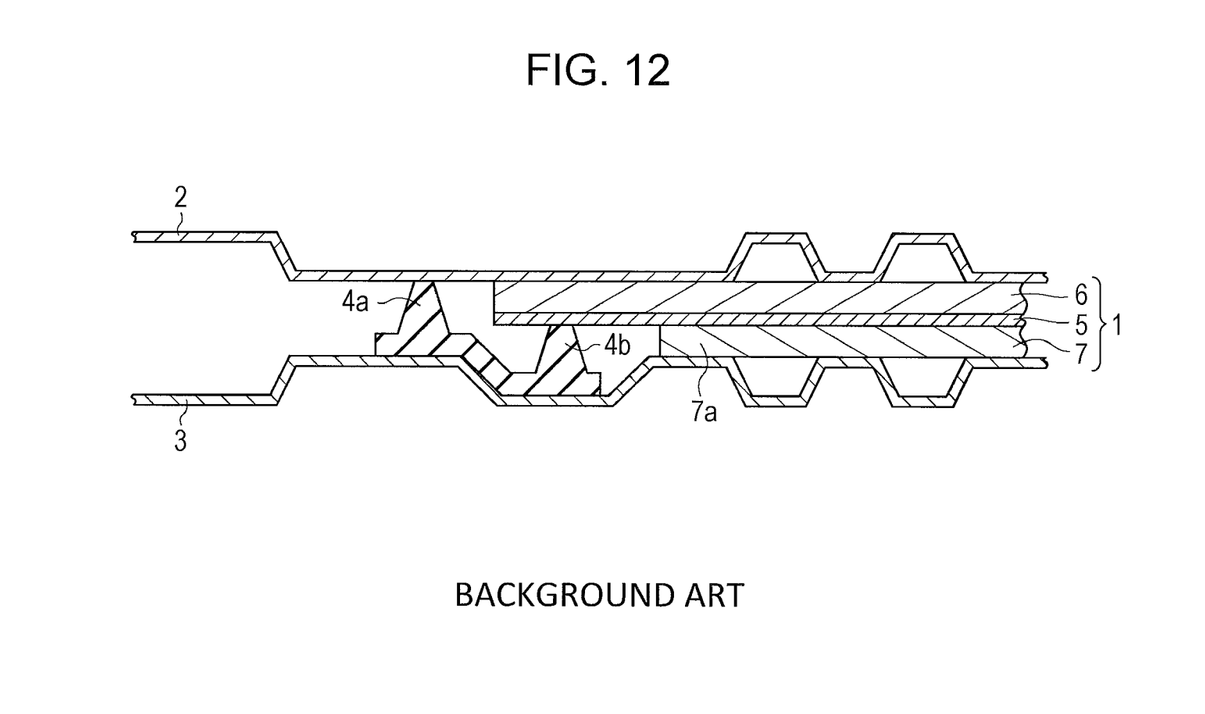
FIG. 12 is a cross-sectional view of a fuel cell disclosed in Japanese Unexamined Patent Application Publication No. 2002-270202.

For example, a fuel cell disclosed in Japanese Unexamined Patent Application Publication No. 2002-270202 includes an electrode structure 1 interposed between a first separator 2 and a second separator 3, as shown in FIG. 12. An outer sealing member 4a that surrounds the outer periphery of the electrode structure 1 hermetically seals the gap between the first separator 2 and the second separator 3 and an inner sealing member 4b hermetically seals the gap between the second separator 3 and the outer periphery of the electrode structure 1.

The electrode structure 1 includes a solid polymer electrolyte membrane 5, and an anode 6 and a cathode 7 respectively disposed on two sides of the solid polymer electrolyte membrane 5. For example, the electrolyte membrane 5 is oblong in shape and has the same size as the anode 6 disposed on one side. The cathode 7 is designed to have a surface area smaller than that of the anode 6.

SUMMARY

According to a first aspect, a fuel cell includes a membrane electrode assembly and separators respectively disposed on both sides of the membrane electrode assembly. The membrane electrode assembly includes a solid polymer electrolyte membrane, a first electrode that includes a first catalyst layer and a first gas diffusion layer and is disposed on one surface of the solid polymer electrolyte membrane, and a second electrode that includes a second catalyst layer and a second gas diffusion layer and is disposed on another surface of the solid polymer electrolyte membrane. A planar size of the first gas diffusion layer is designed to be larger than a planar size of the second gas diffusion layer. One of the separators that faces the second electrode has a thin clearance part at a portion that faces an outer peripheral portion of the second gas diffusion layer.

DESCRIPTION OF THE EMBODIMENTS

Figure 1:
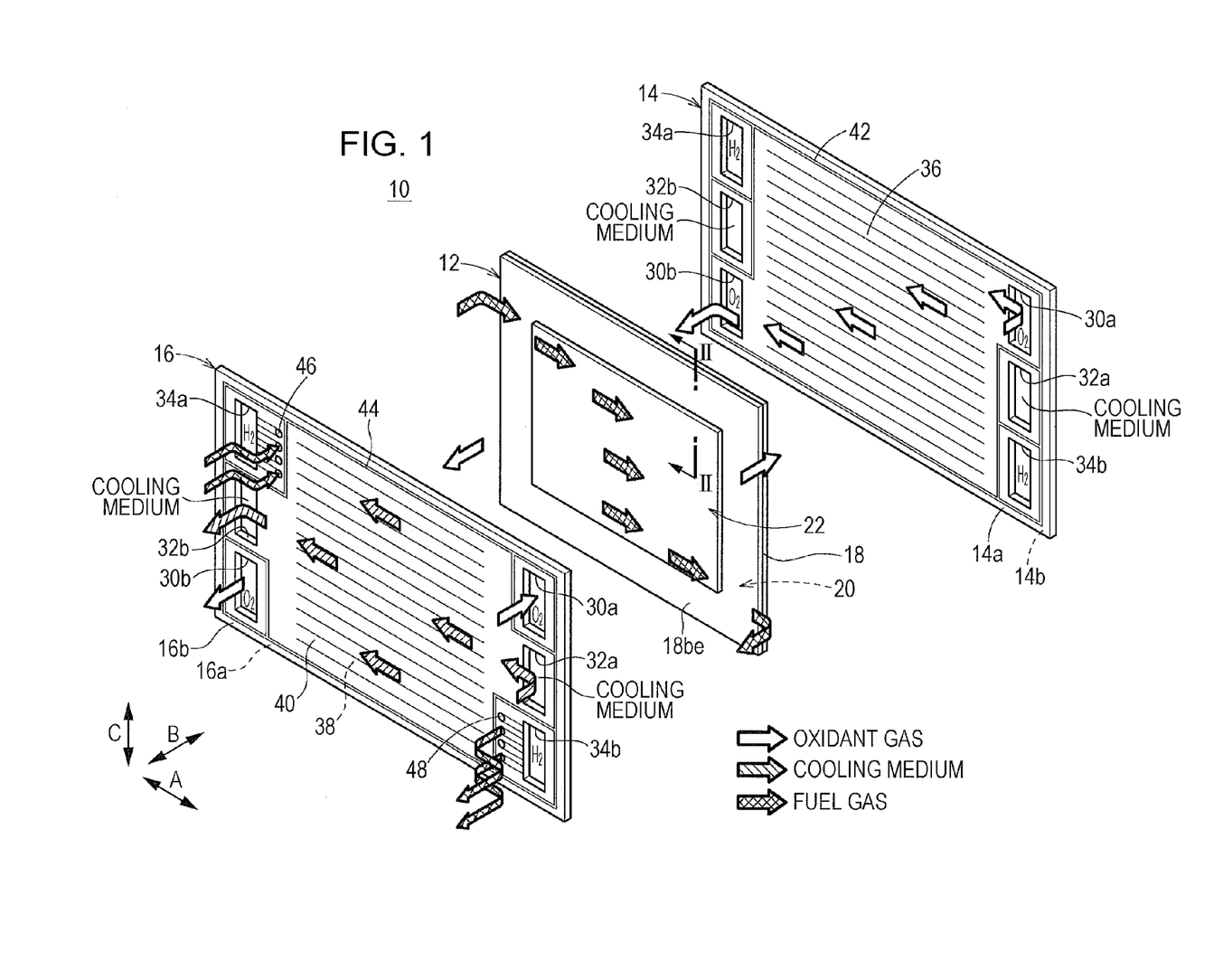
FIG. 1 is an exploded perspective view of a relevant part of a fuel cell according to a first embodiment.
Figure 2:
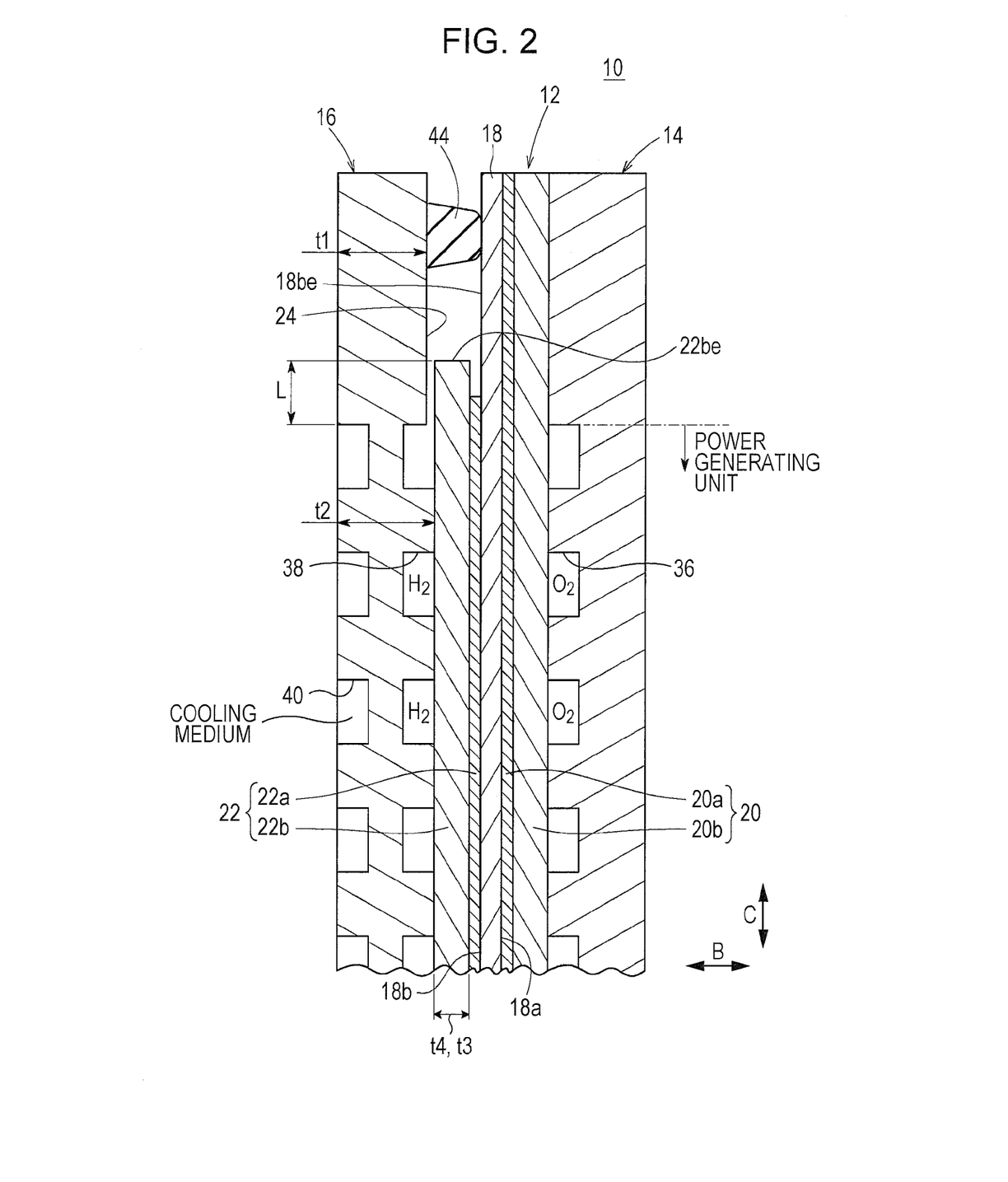
FIG. 2 is a cross-sectional view of the fuel cell taken along line II-II in FIG. 1.

As shown in FIGS. 1 and 2, a fuel cell 10 according to a first embodiment includes a membrane electrode assembly (MEA) 12, and an oblong cathode-side separator 14 and an oblong anode-side separator 16 that sandwich the MEA 12.

The cathode-side separator 14 and the anode-side separator 16 are each constituted by, for example, a carbon separator. Alternatively, the cathode-side separator 14 and the anode-side separator 16 may each be constituted by a metal separator prepared by press-forming a metal sheet instead of a carbon separator.

Referring to FIG. 2, the MEA 12 includes a solid polymer electrolyte membrane 18 constituted by, for example, a perfluorosulfonic acid thin film impregnated with water, and a cathode (first electrode) 20 and an anode (second electrode) 22 that sandwich the solid polymer electrolyte membrane 18. The solid polymer electrolyte membrane 18 contains a fluorine-based electrolyte or hydrocarbon (HC)—based electrolyte.

The anode 22 has a smaller planar size (surface area) than that of the solid polymer electrolyte membrane 18 and the cathode 20 throughout the entire periphery. Alternatively, the planar size correlation between the anode 22 and the cathode 20 may be reversed. For example, the anode 22 may have a larger planar size (surface area) than that of the cathode 20. The outer end of the solid polymer electrolyte membrane 18 protrudes from the outer periphery of a smaller electrode, for example, the anode 22, throughout the entire periphery. The outer end of the solid polymer electrolyte membrane 18 need not be located at the same position as the end portion of the cathode 20, for example.

The cathode 20 is disposed on a surface 18a of the solid polymer electrolyte membrane 18. The anode 22 is disposed on another surface 18b of the solid polymer electrolyte membrane 18 and leaves a frame-shaped outer end portion 18be of the solid polymer electrolyte membrane 18 exposed (see to FIG. 1).

The cathode 20 includes a first electrode catalyst layer (first catalyst layer) 20a joined to the surface 18a of the solid polymer electrolyte membrane 18 and a first gas diffusion layer 20b stacked on the first electrode catalyst layer 20a. The outer peripheral end portions of the first electrode catalyst layer 20a and the first gas diffusion layer 20b are located at the same position as the outer peripheral end portion of the solid polymer electrolyte membrane 18.

The anode 22 includes a second electrode catalyst layer (second catalyst layer) 22a joined to the surface 18b of the solid polymer electrolyte membrane 18 and a second gas diffusion layer 22b stacked on the second electrode catalyst layer 22a. The outer peripheral end portion of the second electrode catalyst layer 22a is at an inward position from the outer peripheral end portion of the second gas diffusion layer 22b. Alternatively, the outer peripheral end portions of the second electrode catalyst layer 22a and the second gas diffusion layer 22b may be located at the same position.

The first electrode catalyst layer 20a and the second electrode catalyst layer 22a are formed by applying a catalyst paste to both sides of the solid polymer electrolyte membrane 18 through printing, coating, or transferring. The catalyst paste is prepared by forming catalyst particles formed of carbon black supporting platinum particles and homogeneously mixing the catalyst particles in a solution of a polymer electrolyte that serves as an ion-conducting binder.

The first gas diffusion layer 20b and the second gas diffusion layer 22b are made from carbon paper or the like. The planar size of the first gas diffusion layer 20b is designed to be larger than the planar size of the second gas diffusion layer 22b.

Referring to FIG. 2, the anode-side separator 16 includes a clearance part 24 at a portion that faces the outer peripheral portion of the second gas diffusion layer 22b. The clearance part 24 is a thin part of the anode-side separator 16 that has been thinned in the thickness direction from the surface of the anode-side separator 16 facing the anode 22.

A thickness t1 of the clearance part 24 is designed to be smaller than the thickness of other parts, for example, a thickness t2 of a part that constitutes a fuel gas channel 38 described below (t1<t2). The clearance part 24 has a part that extends inward by a length L from an outer peripheral end 22be of the second gas diffusion layer 22b. A relationship (t2−t1)>(t3−t4) is established among (t2−t1) and an initial thickness (thickness in the absence of external load) t3 of the second gas diffusion layer 22b and a compressed thickness (thickness under clamp load) t4 of the second gas diffusion layer 22b.

The length L is set to, for example, 0.5 mm or more to prevent creeping of and damage on the solid polymer electrolyte membrane 18 at the second gas diffusion layer 22b in case misalignment occurs between the anode-side separator 16 and the MEA 12.

Referring to FIG. 1, an oxidant gas inlet communication hole 30a through which an oxidant gas, for example, an oxygen-containing gas, is supplied, a cooling medium inlet communication hole 32a through which a cooling medium is supplied, and a fuel gas outlet communication hole 34b through which a fuel gas, for example, a hydrogen-containing gas, is discharged are formed in one end portion of the fuel cell 10 in the arrow A direction (horizontal direction in FIG. 1). These holes are communication holes extending in the arrow B direction which is the stacking direction and are aligned in the arrow C direction (perpendicular direction).

A fuel gas inlet communication hole 34a through which a fuel gas is supplied, a cooling medium outlet communication hole 32b through which the cooling medium is discharged, and an oxidant gas outlet communication hole 30b through which the oxidant gas is discharged are formed in the other end portion of the fuel cell 10 in the arrow A direction. These holes are communication holes extending in the arrow B direction and are aligned in the arrow C direction.

An oxidant gas channel 36 communicating with the oxidant gas inlet communication hole 30a and the oxidant gas outlet communication hole 30b is formed in a surface 14a of the cathode-side separator 14 facing the MEA 12.

A fuel gas channel 38 communicating with the fuel gas inlet communication hole 34a and the fuel gas outlet communication hole 34b is formed in a surface 16a of the anode-side separator 16 facing the MEA 12. A cooling medium channel 40 communicating with the cooling medium inlet communication hole 32a and the cooling medium outlet communication hole 32b is formed between a surface 14b of the cathode-side separator 14 and a surface 16b of the anode-side separator 16.

A first sealing member 42 extending around the outer peripheral portion of the cathode-side separator 14 is formed in the surfaces 14a and 14b of the cathode-side separator 14. A second sealing member 44 extending around the outer peripheral portion of the anode-side separator 16 is formed in the surfaces 16a and 16b of the anode-side separator 16.

The first sealing member 42 and the second sealing member 44 are formed of, for example, an elastic sealing member composed of a sealing material, a cushioning material, or a packing material such as EPDM, NBR, fluororubber, silicone rubber, fluorosilicone rubber, butyl rubber, natural rubber, styrene rubber, chloroprene rubber, or acrylic rubber.

Supply holes 46 that connect the fuel gas inlet communication hole 34a to the fuel gas channel 38 and discharge holes 48 that connect the fuel gas channel 38 to the fuel gas outlet communication hole 34b are formed in the anode-side separator 16.

Operation of the fuel cell 10 having the above-described structure is described below.

First, as shown in FIG. 1, an oxidant gas such as an oxygen-containing gas is supplied to the oxidant gas inlet communication hole 30a and a fuel gas such as a hydrogen-containing gas is supplied to the fuel gas inlet communication hole 34a. A cooing medium such as pure water, ethylene glycol, or oil, is supplied to the cooling medium inlet communication hole 32a.

The oxidant gas is introduced to the oxidant gas channel 36 in the cathode-side separator 14 from the oxidant gas inlet communication hole 30a, moves in the arrow A direction, and reaches the cathode 20 of the MEA 12. The fuel gas is introduced to the fuel gas channel 38 in the anode-side separator 16 through the supply holes 46 from the fuel gas inlet communication hole 34a. The fuel gas moves in the arrow A direction through the fuel gas channel 38 and reaches the anode 22 of the MEA 12.

In the MEA 12, the oxidant gas supplied to the cathode 20 and the fuel gas supplied to the anode 22 are consumed by electrochemical reactions in the first electrode catalyst layer 20a and the second electrode catalyst layer 22a and power is generated as a result.

The oxidant gas supplied to and consumed in the cathode 20 is discharged in the arrow B direction through the oxidant gas outlet communication hole 30b. The fuel gas supplied to and consumed in the anode 22 passes through the discharge holes 48 and is discharged in the arrow B direction through the fuel gas outlet communication hole 34b.

The cooling medium supplied to the cooling medium inlet communication hole 32a is introduced to the cooling medium channel 40 between the cathode-side separator 14 and the anode-side separator 16 and is distributed in the arrow A direction. The cooling medium cools the MEA 12 and is discharged through the cooling medium outlet communication hole 32b.

In the first embodiment, as shown in FIG. 2, the clearance part 24 is formed in a portion of the anode-side separator 16 that faces the outer peripheral portion of the second gas diffusion layer 22b having a smaller planar size than that of the first gas diffusion layer 20b. Accordingly, when a clamp load is applied in the stacking direction to the MEA 12 interposed between the cathode-side separator 14 and the anode-side separator 16, a pressure needed to ensure power generation performance is reliably achieved in a power generating unit (the part on the inner side of the portion where the outermost oxidant gas channel 36 and fuel gas channel 38 face each other) while the load applied to the end portion of the second gas diffusion layer 22b is effectively reduced.

Accordingly, excessive stress does not act on the end portion of the second gas diffusion layer 22b having a planar size smaller than that of the first gas diffusion layer 20b and stress concentration on the solid polymer electrolyte membrane 18 can be suppressed. As a result, the fuel cell 10 exhibits the desired power generating performance and damage on the solid polymer electrolyte membrane 18 and the like can be satisfactorily suppressed.

A fuel cell 60 according to a second embodiment will now be described with reference to FIGS. 3 and 4. The fuel cell 60 includes a resin framed membrane electrode assembly (MEA) 62, and an oblong cathode-side separator 64 and an oblong anode-side separator 66 that sandwich the resin framed MEA 62. The structural elements that are identical to those of the fuel cell 10 according to the first embodiment are represented by the same reference characters and the detailed descriptions therefor are omitted.

The cathode-side separator 64 and the anode-side separator 66 are each constituted by, for example, a carbon separator as in the first embodiment. Alternatively, a metal separator may be used.

Figure 4:
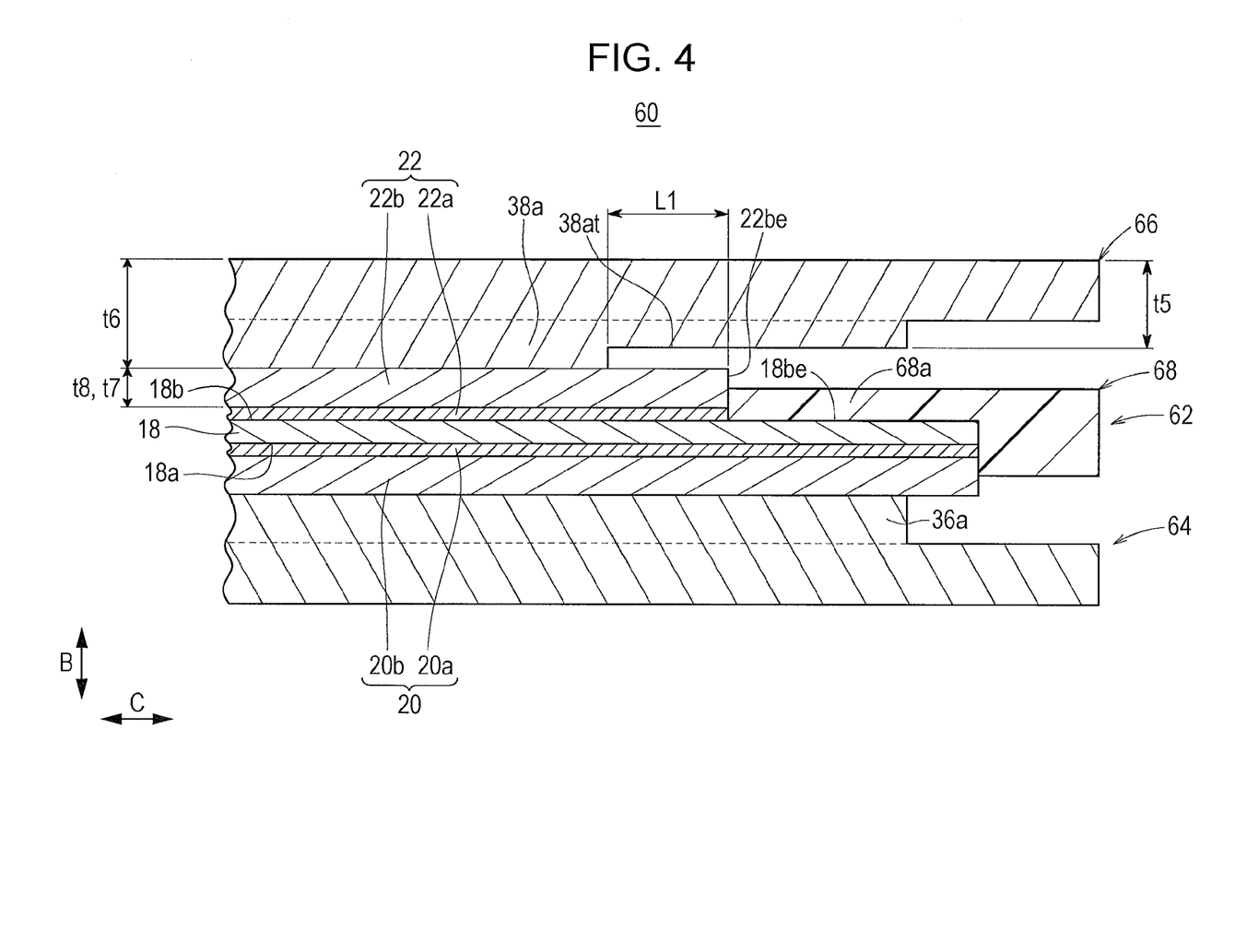
FIG. 4 is a cross-sectional view of the fuel cell taken along line IV-IV in FIG. 3.

Referring to FIG. 4, the resin framed MEA 62 includes a solid polymer electrolyte membrane 18 sandwiched between a cathode 20 and an anode 22, and a resin frame member 68 that surrounds the outer periphery of the solid polymer electrolyte membrane 18. The resin frame member 68 is composed of, for example, polyphenylene sulfide (PPS), polyphthalamide (PPA), or an elastic polymer material.

The resin frame member 68 has a stepped opening on the inner side and has a thin part 68a that protrudes toward the inner side. An inner end of the thin part 68a is joined to the outer peripheral end portion of the anode 22. A flat surface of the thin part 68a is joined to the outer end portion 18be of the solid polymer electrolyte membrane 18. The outer end portion of the thin part 68a is joined to the outer peripheral end portions of the solid polymer electrolyte membrane 18 and the cathode 20.

Figure 5:
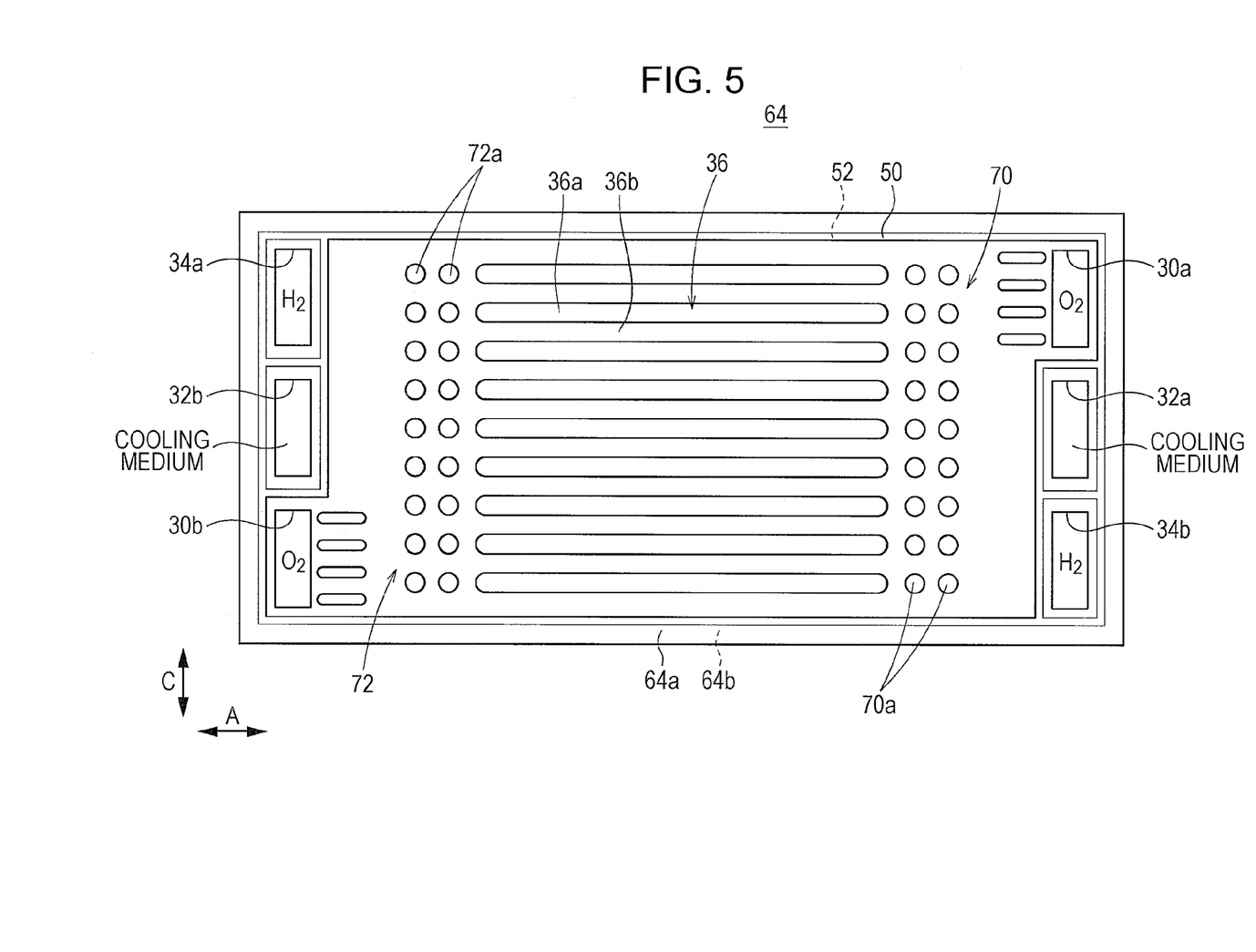
FIG. 5 is a front view of a cathode-side separator of the fuel cell.

Referring to FIG. 5, an oxidant gas channel 36 is formed in a surface 64a of the cathode-side separator 64 facing the resin framed MEA 62. The oxidant gas channel 36 includes a number of linear channel grooves 36b formed between a number of linear projections 36a extending in the arrow A direction.

An inlet buffer portion 70 is connected to the inlet side of the oxidant gas channel 36. An outlet buffer portion 72 is connected to the outlet side of the oxidant gas channel 36. The inlet buffer portion 70 includes a number of embosses 70a projecting toward the resin framed MEA 62 side. The outlet buffer portion 72 includes a number of embosses 72a projecting toward the resin framed MEA 62 side.

Figure 3:
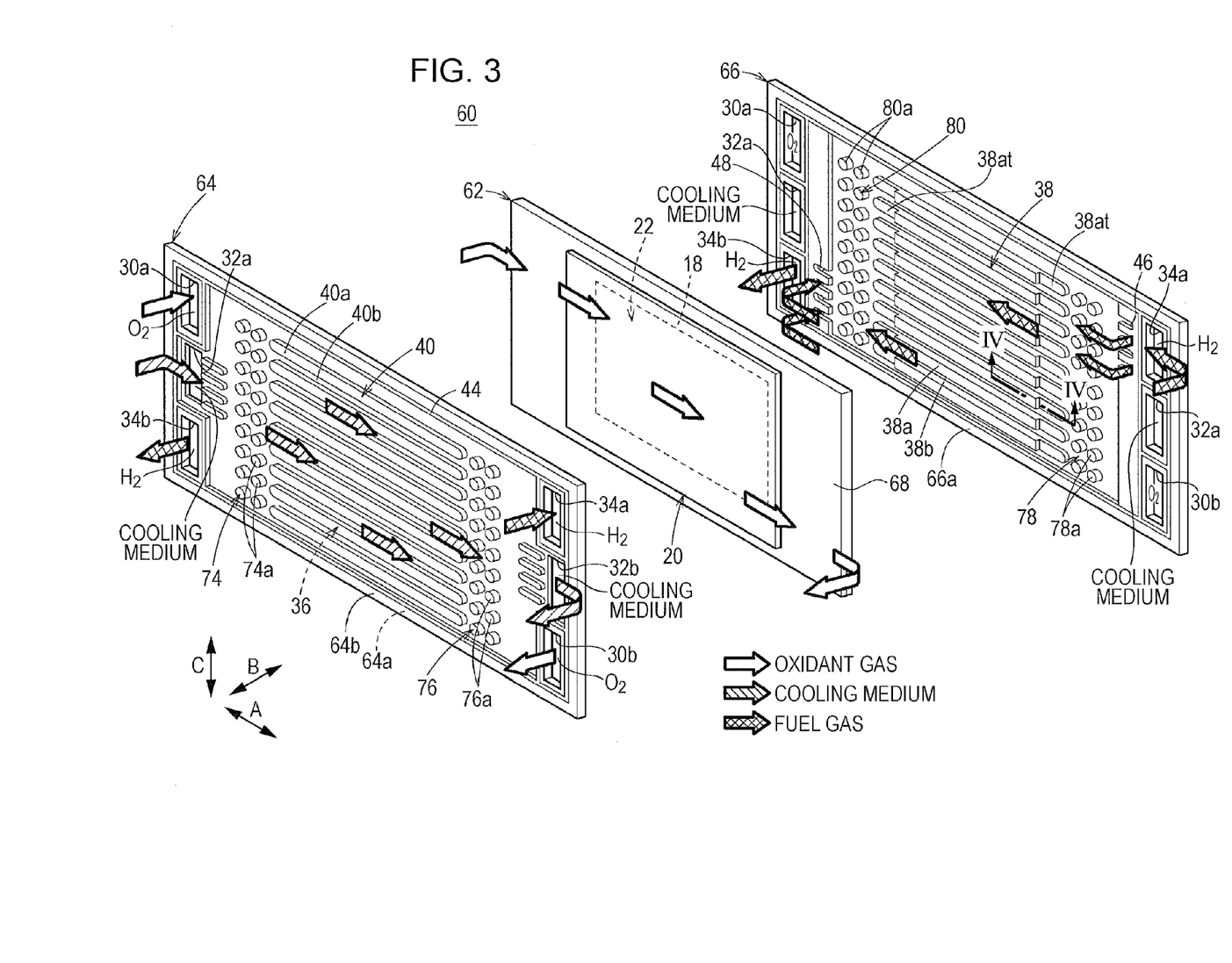
FIG. 3 is an exploded perspective view of a relevant part of a fuel cell according to a second embodiment.

Referring to FIG. 3, a cooling medium channel 40 is formed in a surface 64b of the cathode-side separator 64 opposite the surface 64a. The cooling medium channel 40 has a number of linear channel grooves 40b formed between a number of linear projections 40a extending in the arrow A direction. The cooling medium channel 40 is connected to an inlet buffer portion 74 and an outlet buffer portion 76. The inlet buffer portion 74 includes a number of embosses 74a. The outlet buffer portion 76 includes a number of embosses 76a.

Figure 6:
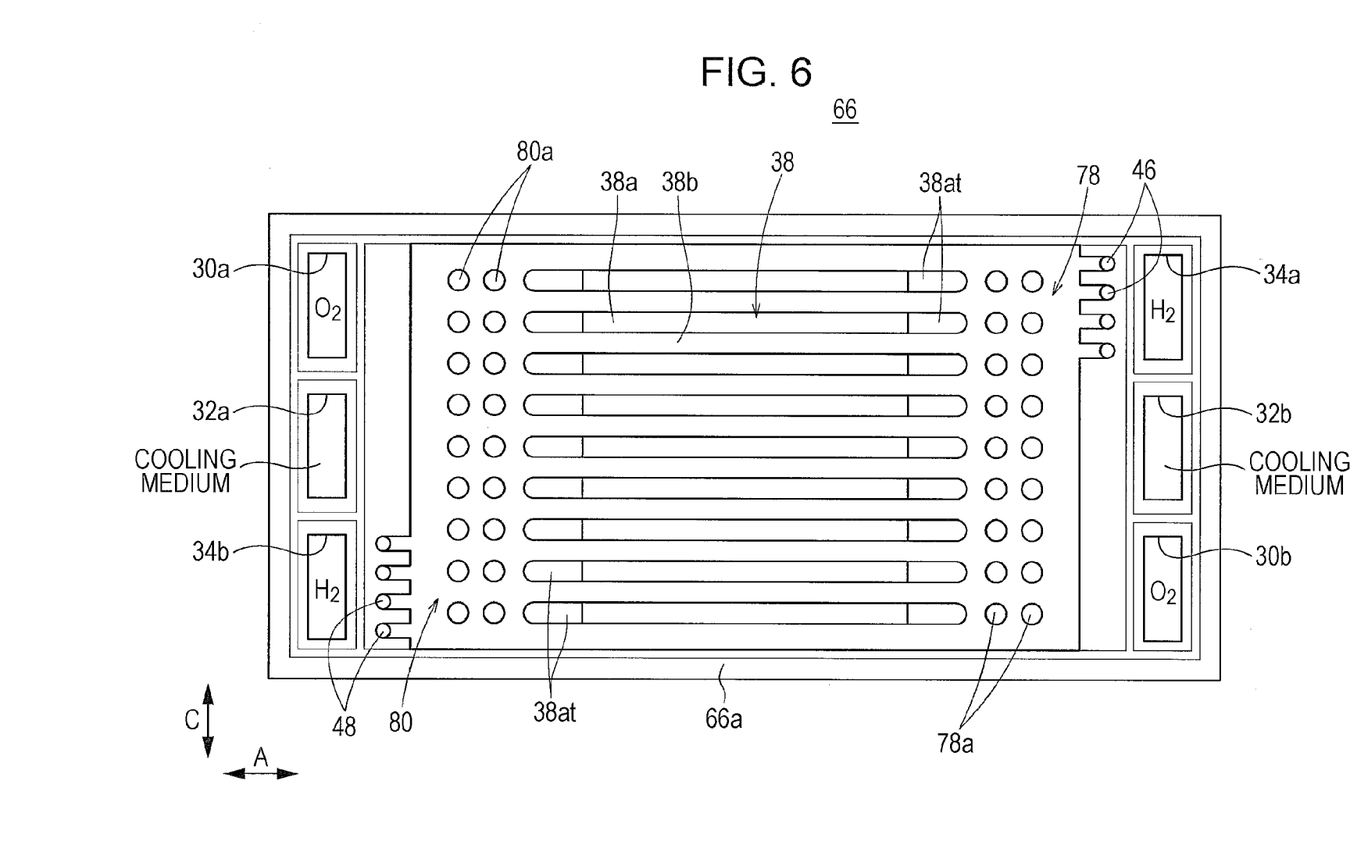
FIG. 6 is a front view of an anode-side separator of the fuel cell.

Referring to FIGS. 3 and 6, a fuel gas channel 38 is formed in a surface 66a of the anode-side separator 66 facing the resin framed MEA 62. The fuel gas channel 38 includes a number of linear channel grooves 38b formed between a number of linear projections 38a extending in the arrow A direction. Portions of the anode-side separator 66 that face the outer peripheral portion of the second gas diffusion layer 22b, i.e., the two end portions of each linear projection 38a in the arrow A direction, have thin clearance parts 38at formed therein.

Referring to FIG. 4, a thickness t5 of the clearance part 38at is designed to be smaller than the thickness of other parts, for example, a thickness t6 of the part that forms the fuel gas channel 38 (linear projections 38a) (t5<t6). The clearance part 38at has a part that extends inward by a length L1 from the outer peripheral end 22be of the second gas diffusion layer 22b. A relationship (t6−t5)>(t7−t8) is established among (t6−t5) and an initial thickness (thickness in the absence of external load) t7 of the second gas diffusion layer 22b and a compressed thickness (thickness under clamp load) t8 of the second gas diffusion layer 22b. The length L1 is set to, for example, 0.5 mm.

Referring to FIG. 6, an inlet buffer portion 78 is connected to the inlet side of the fuel gas channel 38. An outlet buffer portion 80 is connected to the outlet side of the fuel gas channel 38. The inlet buffer portion 78 includes a number of embosses 78a. The outlet buffer portion 80 includes a number of embosses 80a.

In the second embodiment having the above-described structure, as shown in FIG. 4, the clearance part 38at having a small thickness is formed in the anode-side separator 66 at a portion that faces the outer peripheral portion of the second gas diffusion layer 22b having a smaller planar size than the first gas diffusion layer 20b. In other words, a clearance part 38at is formed at each of two end portions of each linear projection 38a in the arrow A direction.

Thus, stress concentration on the solid polymer electrolyte membrane 18 can be suppressed. Accordingly, the same advantages as those of the first embodiment can be achieved. Namely, the desired power generation performance is achieved and damage on the solid polymer electrolyte membrane 18 and the like can be satisfactorily suppressed.

Figure 7:
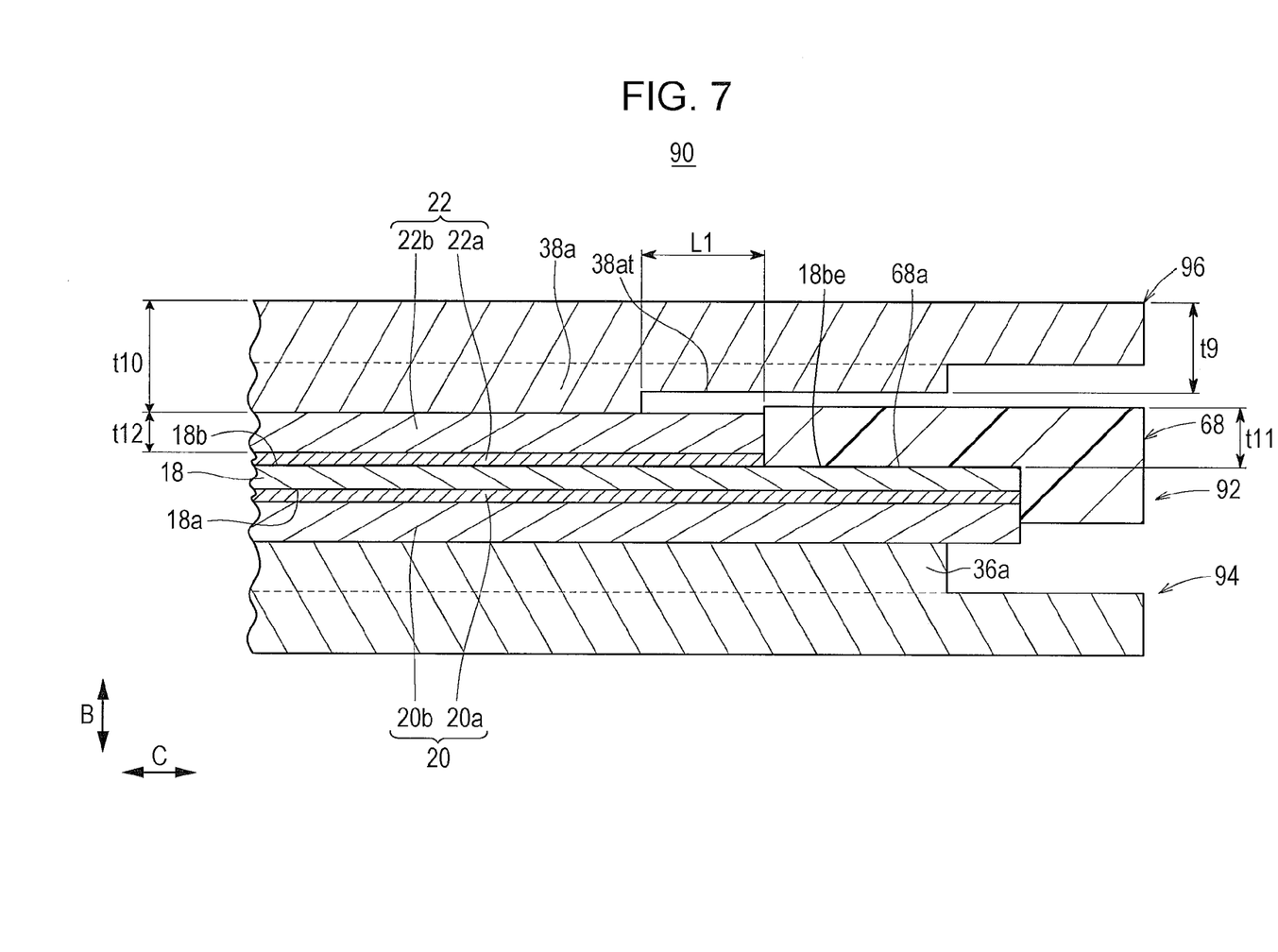
FIG. 7 is a cross-sectional view of a relevant part of a fuel cell according to a third embodiment.

A fuel cell 90 according to a third embodiment will now be described. Referring to FIG. 7, the fuel cell 90 includes a resin framed MEA 92, and a cathode-side separator 94 and an anode-side separator 96 that sandwich the resin framed MEA 92.

The structural elements that are identical to those of the fuel cell 60 according to the second embodiment are represented by the same reference characters and the detailed descriptions therefor are omitted. The same applies to the description of a fourth embodiment below.

A thickness t9 of the clearance part 38at is designed to be smaller than the thickness of other parts, for example, a thickness t10 of the part that forms a fuel gas channel 38 (linear projections 38a) (t9<t10). A relationship (t10−t9)>(t11−t12) is established among (t10−t9), a thickness t11 of the thin part 68a of the resin frame member 68, and a compressed thickness (thickness under clamp load) t12 of the second gas diffusion layer 22b.

Figure 8:
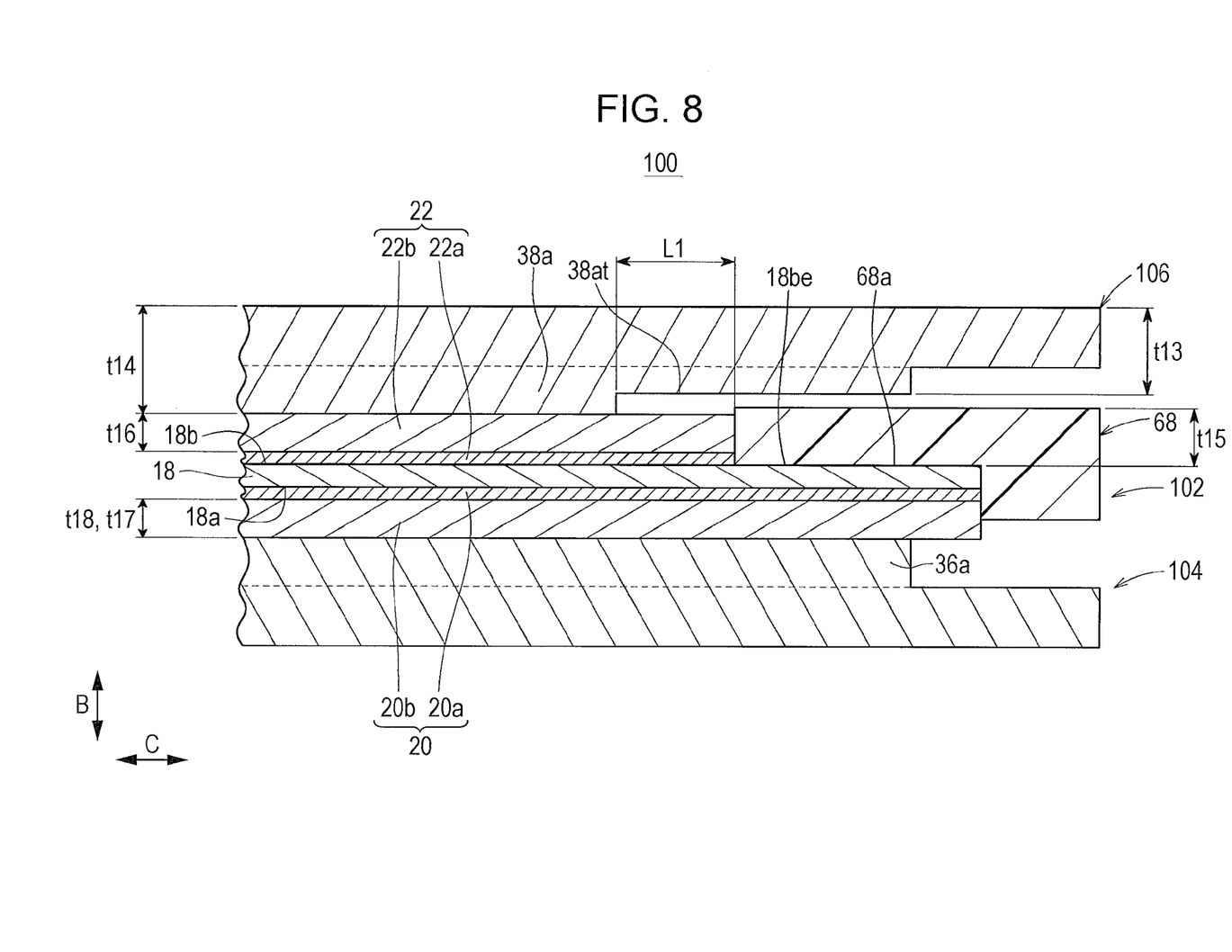
FIG. 8 is a cross-sectional view of a relevant part of a fuel cell according to a fourth embodiment.

Referring to FIG. 8, a fuel cell 100 according to a fourth embodiment includes a resin framed MEA 102, and a cathode-side separator 104 and an anode-side separator 106 that sandwich the resin framed MEA 102.

A thickness t13 of the clearance part 38at is designed to be smaller than a thickness of other parts, for example, the thickness t14 of the part that forms a fuel gas channel 38 (linear projections 38a) (t13<t14). A relationship (t14−t13)>(t15−t16)+(t17−t18) is established among (t14−t13), a thickness t15 of the thin part 68a of the resin frame member 68, a compressed thickness (thickness under clamp load) t16 of the second gas diffusion layer 22b, an initial thickness (thickness in the absence of external load) t17 of the first gas diffusion layer 20b, and a compressed thickness (thickness under clamp load) t18 of the first gas diffusion layer 20b.

The third and fourth embodiments having the above-described structures achieve the same advantages as those of the first and second embodiments.

Figure 9:
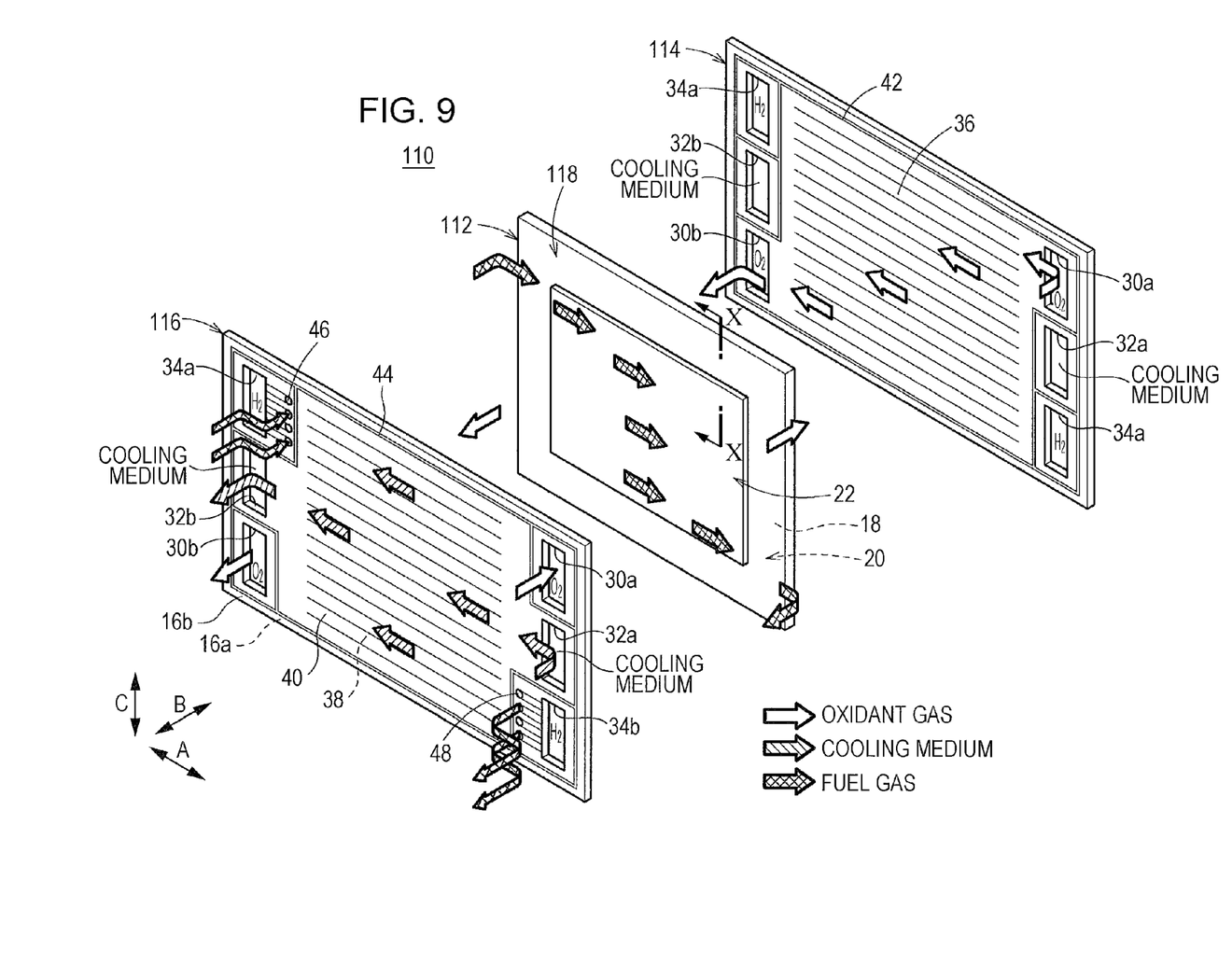
FIG. 9 is an exploded perspective view of a fuel cell according to a fifth embodiment.

Referring to FIG. 9, a fuel cell 110 according to a fifth embodiment includes a resin framed MEA 112, and a cathode-side separator 114 and an anode-side separator 116 that sandwich the resin framed MEA 112.

The structural elements that are identical to those of the fuel cell 10 according to the first embodiment are represented by the same reference characters and the detailed descriptions therefor are omitted. The same applies to the description of a sixth embodiment below.

Figure 10:
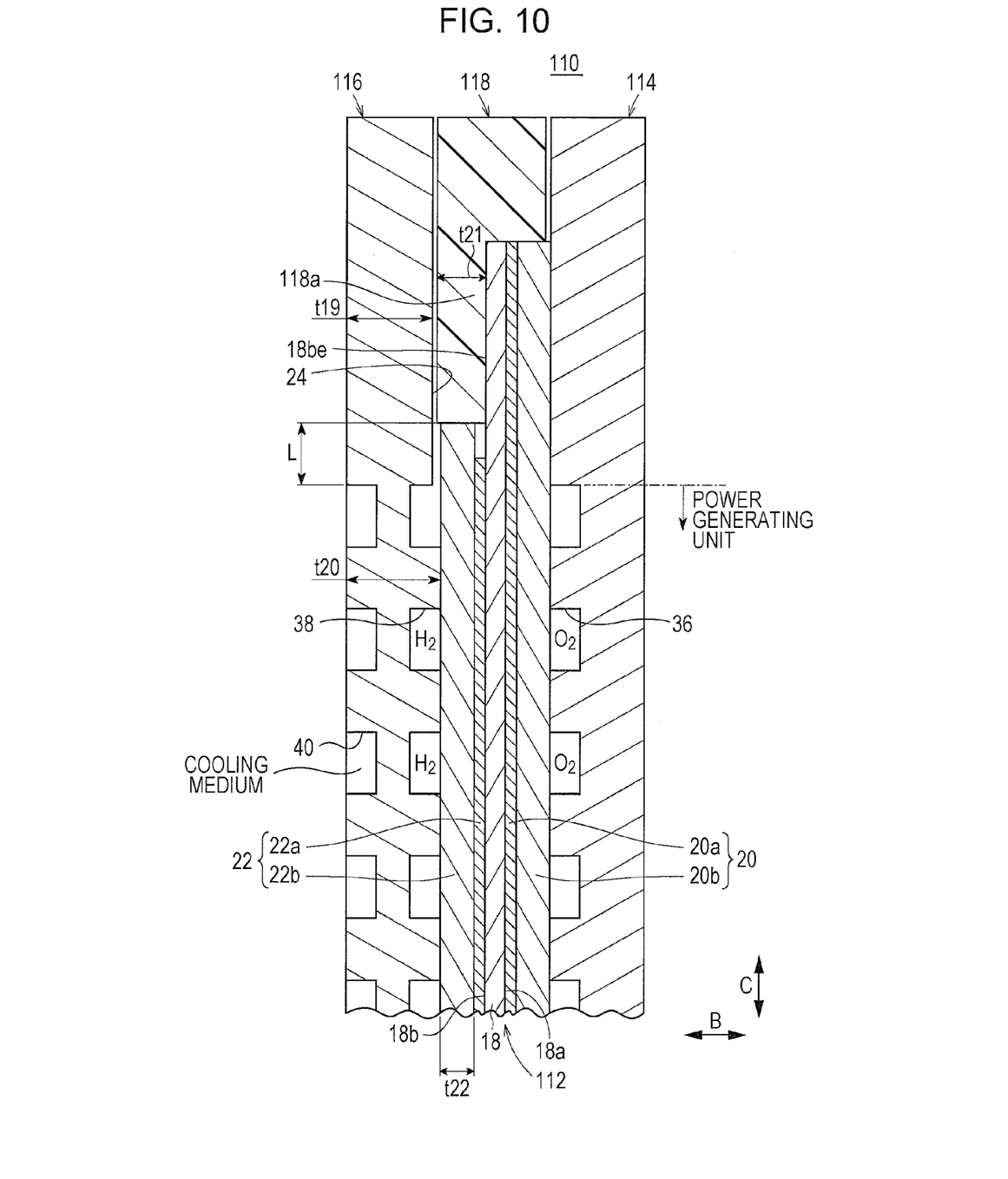
FIG. 10 is a cross-sectional view of the fuel cell taken along line X-X in FIG. 9.

Referring to FIG. 10, the resin framed MEA 112 includes a resin frame member 118 that surrounds the outer periphery of the solid polymer electrolyte membrane 18. The resin frame member 118 has the same configuration as that of the resin frame member 68 and includes a thin part 118a that protrudes toward the inner side. An inner end of the thin part 118a is joined to the outer peripheral end portion of the anode 22. A flat surface of the thin part 118a is joined to the outer end portion 18be of the solid polymer electrolyte membrane 18. An outer end portion of the thin part 118a is joined to the outer peripheral end portions of the solid polymer electrolyte membrane 18 and the cathode 20.

A thickness t19 of the clearance part 24 is designed to be smaller than the thickness of other parts, for example, a thickness t20 of the part that forms the fuel gas channel 38 (t19<t20). A relationship (t20−t19)>(t21−t22) is established among (t20−t19) and a thickness t21 of the thin part 118a of the resin frame member 118 and a compressed thickness (thickness under clamp load) T22 of the second gas diffusion layer 22b.

Figure 11:
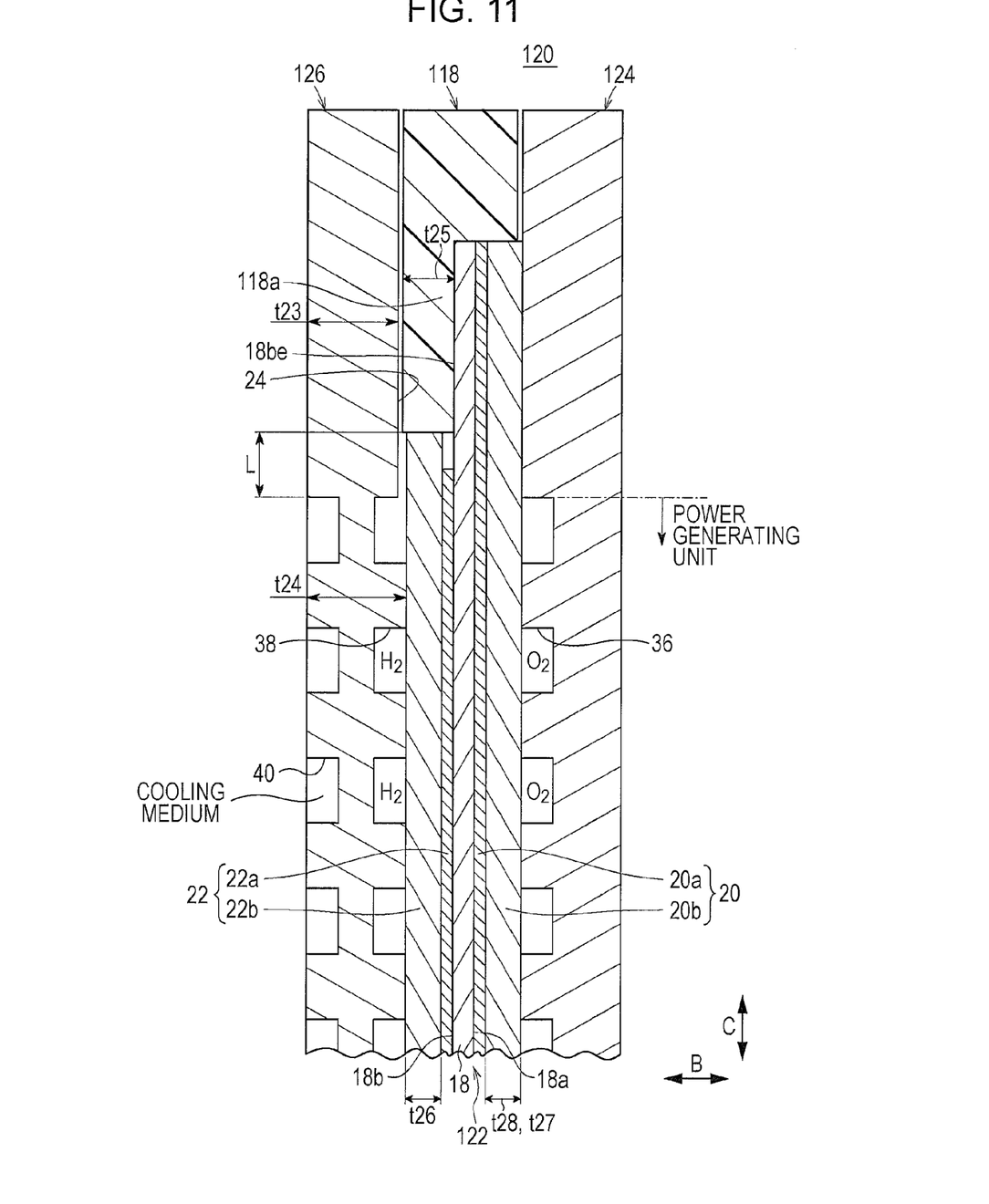
FIG. 11 is an exploded perspective view of a fuel cell according to a sixth embodiment.

Referring to FIG. 11, a fuel cell 120 according to a sixth embodiment includes a resin framed MEA 122, and a cathode-side separator 124 and an anode-side separator 126 that sandwich the resin framed MEA 122.

A thickness t23 of the clearance part 24 is designed to be smaller than the thickness of other parts, for example, a thickness t24 of the part that forms the fuel gas channel 38 (linear projections 38a) (t23<t24). A relationship (t24−t23)>(t25−t26)+(t27−t28) is established among (t24−t23), a thickness t25 of the thin part 118a of the resin frame member 118, a compressed thickness (thickness under clamp load) t26 of the second gas diffusion layer 22b, an initial thickness (thickness in the absence of external load) t27 of the first gas diffusion layer 20b, and a compressed thickness (thickness under clamp load) t28 of the first gas diffusion layer 20b.

The fifth and sixth embodiments having the above-described structures achieve the same advantages as those of the first to fourth embodiments.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   a membrane electrode assembly comprising:
   a solid polymer electrolyte membrane;
   a first electrode disposed on one surface of the solid polymer electrolyte membrane and comprising:
   a first catalyst layer; and
   a first gas diffusion layer; and
   a second electrode disposed on another surface of the solid polymer electrolyte membrane and comprising:
   a second catalyst layer; and
   a second gas diffusion layer, a planar size of the first gas diffusion layer being larger than a planar size of the second gas diffusion layer; and
   separators respectively disposed on both sides of the membrane electrode assembly, one of the separators that faces the second electrode having a portion that faces an outer peripheral portion of the second gas diffusion layer and having an outer peripheral portion at an outward position relative to the outer peripheral portion of the second gas diffusion layer in a direction orthogonal to a stacking direction of the fuel cell,
   wherein the one of the separators that faces the second electrode has a reduced thickness as compared with a thickness of the one of the separators that faces the second electrode at an inward adjacent portion that faces and directly contacts the second gas diffusion layer, the thicknesses being measured in the stacking direction of the fuel cell,
   wherein the reduced thickness of the one of the separators that faces the second electrode forms a gap between the outer peripheral portion of the second gas diffusion layer and the one of the separators that faces the second electrode, the gap being an empty space directly between the one of the separators that faces the second electrode and the outer peripheral portion of the second gas diffusion layer in the stacking direction of the fuel cell, and
   wherein the reduced thickness of the one of the separators that faces the second electrode extends between the inward adjacent portion and the outer peripheral portion of the one of the separators along a length direction of the one of the separators, including a region that does not contain the outer peripheral portion of the one of the separators and does not contact the second gas diffusion layer, the length direction being orthogonal to the stacking direction of the fuel cell.

2. The fuel cell according to claim 1, wherein the reduced thickness of the one of the separators that faces the second electrode extends inward from an outer peripheral end of the second gas diffusion layer.

3. The fuel cell according to claim 1, wherein the second electrode is an anode electrode.

4. The fuel cell according to claim 1, wherein the reduced thickness of the one of the separators that faces the second electrode overlaps the outer peripheral portion of the second gas diffusion layer in the stacking direction of the fuel cell.

5. The fuel cell according to claim 4, wherein an entirety of the reduced thickness of the one of the separators that faces the second electrode is in a non-contact relationship with the second gas diffusion layer.

6. The fuel cell according to claim 1, wherein the gap is disposed outside of a power generating region of the fuel cell.

7. The fuel cell according to claim 1, wherein the outer peripheral portion of the second gas diffusion layer is disposed outside of a power generating region of the fuel cell.

8. The fuel cell according to claim 1,
wherein the one of the separators that faces the second electrode comprises a plurality of reactant gas channel grooves through which a reactant gas flows, the reactant gas channel grooves disposed between a plurality of projections, and
wherein the reduced thickness of the one of the separators that faces the second electrode is formed in at least one of the projections such that the projection has a portion with a reduced thickness.

9. The fuel cell according to claim 1, wherein the outer peripheral portion is disposed at an outward position of the second gas diffusion layer in the direction orthogonal to the stacking direction.

10. The fuel cell according to claim 1, further comprising a sealing member disposed on the reduced thickness of the one of the separators that faces the second electrode at an outward position relative to the outer peripheral portion of the second gas diffusion layer in the direction orthogonal to the stacking direction of the fuel cell.

11. The fuel cell according to claim 1, wherein the second catalyst layer includes an outer peripheral portion that faces the gap, the outer peripheral portion of the second catalyst layer being disposed inward relative to the outer peripheral portion of the second gas diffusion layer.

12. The fuel cell according to claim 1, wherein an entirety of the outer peripheral portion of the one of the separators that faces the second electrode does not contact the second gas diffusion layer.

13. The fuel cell according to claim 12, wherein the outer peripheral portion of the one of the separators that faces the second electrode includes an outward portion that has a thickness that is different than the reduced thickness of the one of the separators.

14. A fuel cell comprising:
a membrane electrode assembly comprising:
a solid polymer electrolyte membrane;
a first electrode disposed on one surface of the solid polymer electrolyte membrane and comprising:
a first catalyst layer; and
a first gas diffusion layer; and
a second electrode disposed on another surface of the solid polymer electrolyte membrane and comprising:
a second catalyst layer; and
a second gas diffusion layer, a planar size of the first gas diffusion layer being larger than a planar size of the second gas diffusion layer; and
separators respectively disposed on both sides of the membrane electrode assembly, one of the separators that faces the second electrode having a portion that faces an outer peripheral portion of the second gas diffusion layer,
wherein the one of the separators that faces the second electrode has a reduced thickness as compared with a thickness of the one of the separators that faces the second electrode at an inward adjacent portion that faces and directly contacts the second gas diffusion layer, the thicknesses being measured in a stacking direction of the fuel cell,
wherein the reduced thickness of the one of the separators that faces the second electrode forms a gap between the outer peripheral portion of the second gas diffusion layer and the one of the separators that faces the second electrode, the gap being an empty space directly between the one of the separators that faces the second electrode and the outer peripheral portion of the second gas diffusion layer in the stacking direction of the fuel cell,
wherein the fuel cell further comprises a sealing member disposed on the reduced thickness of the one of the separators that faces the second electrode at an outward position relative to the outer peripheral portion of the second gas diffusion layer in a direction orthogonal to the stacking direction of the fuel cell, and
wherein the reduced thickness of the one of the separators that faces the second electrode extends between the inward adjacent portion of the one of the separators and the sealing member along a length direction of the one of the separators including a region in which the reduced thickness of the one of the separators that faces the second electrode does not overlap the sealing member in the stacking direction of the fuel cell, the length direction being orthogonal to the stacking direction of the fuel cell.

* * * * *